(12) United States Patent
Marini

(10) Patent No.: US 10,574,065 B2
(45) Date of Patent: Feb. 25, 2020

(54) APPARATUS AND METHOD FOR CHARGING BATTERIES

(71) Applicant: Tek Global S.r.L., Pesaro (Pesaro e Urbino) (IT)

(72) Inventor: Maurizio Marini, Lugano (CH)

(73) Assignee: Tek Global S.r.L., Pesaro (Pesaro e (IT)

(*) Notice: Subject to any disclaimer, the term of this patent is extended or adjusted under 35 U.S.C. 154(b) by 0 days.

(21) Appl. No.: 16/186,060

(22) Filed: Nov. 9, 2018

(65) Prior Publication Data

US 2019/0081488 A1 Mar. 14, 2019

Related U.S. Application Data

(62) Division of application No. 14/899,049, filed as application No. PCT/IB2015/052185 on Mar. 25, 2015, now abandoned.

(30) Foreign Application Priority Data

Mar. 25, 2014 (IT) .............................. MO2014A0073
Mar. 25, 2014 (IT) .............................. MO2014A0074
May 27, 2014 (IT) .............................. MO2014A0152

(51) Int. Cl.
*H02J 7/00* (2006.01)
*H02J 7/04* (2006.01)

(52) U.S. Cl.
CPC ............ *H02J 7/0021* (2013.01); *H02J 7/007* (2013.01); *H02J 7/0047* (2013.01);
(Continued)

(58) Field of Classification Search
CPC .................................................. H02J 7/0093
(Continued)

(56) References Cited

U.S. PATENT DOCUMENTS 5,801,515 A 9/1998 Chen et al.
6,222,342 B1 4/2001 Eggert et al.
(Continued)

FOREIGN PATENT DOCUMENTS

CN 103441547 A 12/2013
DE 19822635 A1 12/1999
(Continued)

OTHER PUBLICATIONS

International Search Report and Written Opinion of the International Searching Authority Application No. PCT/EP2015/052185 Completed: May 26, 2015; dated Jun. 3, 2015 11 pages.
(Continued)

*Primary Examiner* — Edward Tso
*Assistant Examiner* — Ahmed H Omar
(74) *Attorney, Agent, or Firm* — Whitmyer IP Group LLC

(57) ABSTRACT

An apparatus and a method for charging a battery are disclosed. The apparatus includes a LED member that includes a single LED that is suitable for emitting light of different colours, each colour corresponding to a different operating status of the apparatus, and an acoustic signalling device that is suitable for emitting an acoustic signal indicating a malfunction of the apparatus or the battery. The method includes a first battery heating and desulphation step during which the battery is supplied with current pulses having a maximum value that is considerably lower than the maximum value of the charging current in a subsequent second constant current charging step, each current pulse being generated when the current absorbed by the battery after the delivery of a previous current pulse falls below a minimum preset value.

4 Claims, 6 Drawing Sheets

(52) U.S. Cl.
CPC ......... *H02J 7/0073* (2013.01); *H02J 7/0093* (2013.01); *H02J 7/047* (2013.01)

(58) Field of Classification Search
USPC ........................................................ 320/139
See application file for complete search history.

(56) References Cited

U.S. PATENT DOCUMENTS

| | | | | |
|---|---|---|---|---|
| 9,035,623 | B1* | 5/2015 | Berkowitz | ............ H02J 7/0077 320/112 |
| 2004/0090209 | A1* | 5/2004 | Nishida | ................. H02J 7/0073 320/149 |
| 2008/0119241 | A1 | 5/2008 | Dorogusker et al. | |
| 2008/0231236 | A1 | 9/2008 | Watanabe et al. | |
| 2010/0001682 | A1 | 1/2010 | Dickson et al. | |
| 2010/0171465 | A1 | 7/2010 | Seal et al. | |
| 2013/0099738 | A1 | 4/2013 | Brockman et al. | |
| 2013/0106352 | A1 | 5/2013 | Nagamine | |
| 2013/0119783 | A1 | 5/2013 | Xu | |
| 2013/0320933 | A1 | 12/2013 | Tang et al. | |
| 2014/0111159 | A1 | 4/2014 | Siminoff et al. | |

FOREIGN PATENT DOCUMENTS

| | | |
|---|---|---|
| EP | 2660945 A1 | 11/2013 |
| EP | 2695762 A2 | 2/2014 |
| JP | 2000323188 A | 11/2000 |
| JP | 2004079374 A | 3/2004 |
| WO | 0129951 A1 | 4/2001 |
| WO | 0178211 A1 | 10/2001 |

OTHER PUBLICATIONS

Italian Search Report Application No. IT-MO2014A000152 Completed: Feb. 4, 2015 8 pages.
Italian Search Report Application No. IT-MO2014A000074 Completed: Mar. 13, 2015 7 pages.
Italian Search Report Application No. IT-MO2014A000073 Completed: Mar. 13, 2015 7 pages.
U.S. Office Action U.S. Appl. No. 14/899,049 dated Jan. 11, 2018 9 pages
U.S. Office Action U.S. Appl. No. 14/899,049 dated: Jun. 2, 2017 11 pages
U.S. Office Action U.S. Appl. No. 14/899,049 dated: Jul. 11, 2018 10 Pages.
Chinese Office Action Application No. 201580013505.4 Completed: Jul. 4, 2018 6 Pages.
European Office Action Application No. 15717642.1 Completed: Oct. 2, 2018 3 Pages
Translation Chinese Office Action Application No. 201580013505.4 Completed: Jul. 4, 2018 3 Pages.

* cited by examiner

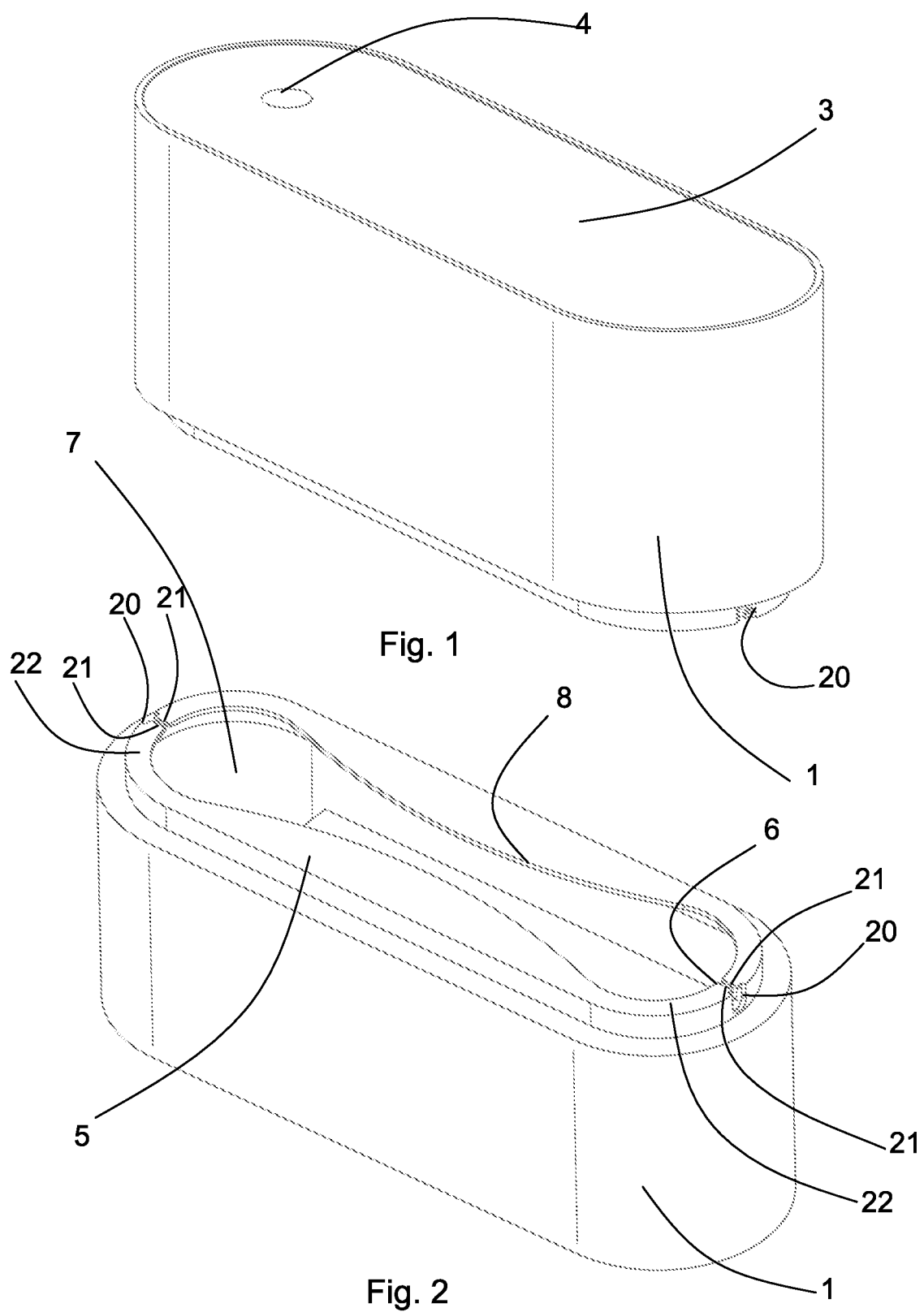

APPARATUS AND METHOD FOR CHARGING BATTERIES

CROSS-REFERENCE TO RELATED APPLICATIONS

This application is a divisional of U.S. patent application Ser. No. 14/899,049, filed Dec. 16, 2015, which is a 371 of International Patent Application No. PCT/IB2015/052185 filed Mar. 25, 2015. PCT/IB2015/052185 claims priority to IT Application Nos. MO2014A000073 filed Mar. 25, 2014, MO2014A000074 filed Mar. 25, 2014 and MO2014A000152 filed May 27, 2014. The entire contents of these applications are incorporated herein by reference.

FIELD OF THE INVENTION

The present invention relates to an apparatus and a method for charging batteries, for example lead-acid batteries, that is able to carry out the most suitable charging procedure for the battery and further enable an optimum battery charge level to be maintained, in particular when the battery has been inactive for long periods, although it is connected to an electric plant, for example a battery of a motor vehicle that has remained unused for relatively long periods.

BACKGROUND OF THE INVENTION

In the prior art, battery-charging apparatuses are known that are able to recognise the type of battery to which they are connected and applying thereto a charging procedure that is suitable for this type of battery.

Nevertheless, known apparatuses for charging batteries are not able to run battery charging cycles that are suitable for optimising the lifespan of the battery in any condition, in particular they are unable to recognise automatically if the battery needs a charging procedure that enables the phenomenon of sulphation to be countered and the battery charge to be maintained in conditions in which the battery is subject to relatively long periods of inactivity, whilst remaining connected to the electric circuit supplied by the battery, as in the case of batteries of motor vehicles that may remain unused for relatively long periods.

SUMMARY OF THE INVENTION

The present invention provides an apparatus and a method for charging a battery that enables battery-charging cycles to be run so as to maximise the lifespan of the battery and to maintain the battery automatically in optimum charging conditions, in particular during periods of inactivity of the battery. The apparatus and the method have to be simple and easy to use also for users who are not technically qualified.

The objects of the present invention are reached by an apparatus for charging batteries and/or by a method for charging batteries according to the present invention.

Owing to the invention, it is possible to run battery-charging cycles, running the most suitable charging cycle for the battery, also solving the problem of possible sulphation of the battery and being able to maintain an optimum battery charging level even during prolonged periods of inactivity.

BRIEF DESCRIPTION OF THE DRAWINGS

One mode of carrying out the invention is disclosed below, with reference to the attached drawings, in which:

FIG. 1 is a perspective view of an apparatus according to the invention;

FIG. 2 is a perspective view from below of the apparatus of FIG. 1;

DETAILED DESCRIPTION OF THE INVENTION

An apparatus for charging batteries according to the invention comprises a body 1, inside which the electric and electronic components are housed (FIG. 5 and FIG. 6) to charge a battery 2 and control the charging procedure.

On an upper face 3 of the body 1 a LED 4 is arranged that indicates the status of a battery to which the apparatus according to the invention is connected and the status of the battery charging procedure.

The LED 4 is an RGB LED, i.e. a LED that can emit light of different colours such as, for example, red, yellow and green, to indicate the various statuses of the battery 2 and of the charging procedure, as will be detailed below. The use of a single RGB LED enables the indication of battery status and of the charging procedure to be made extremely simple and clear for the user.

Figure 5:
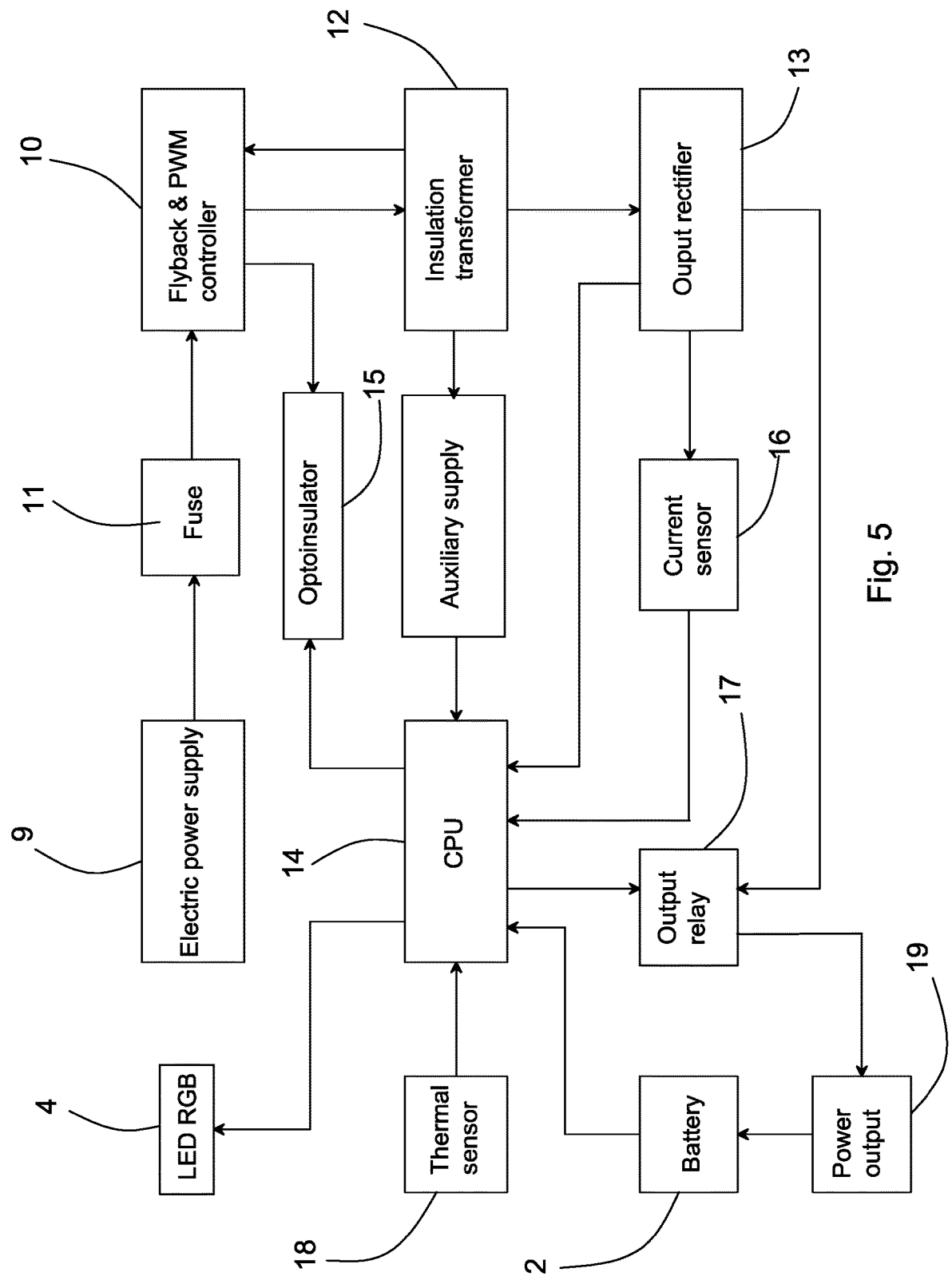
FIG. 5 is a block diagram of an apparatus according to the invention.
Figure 6:
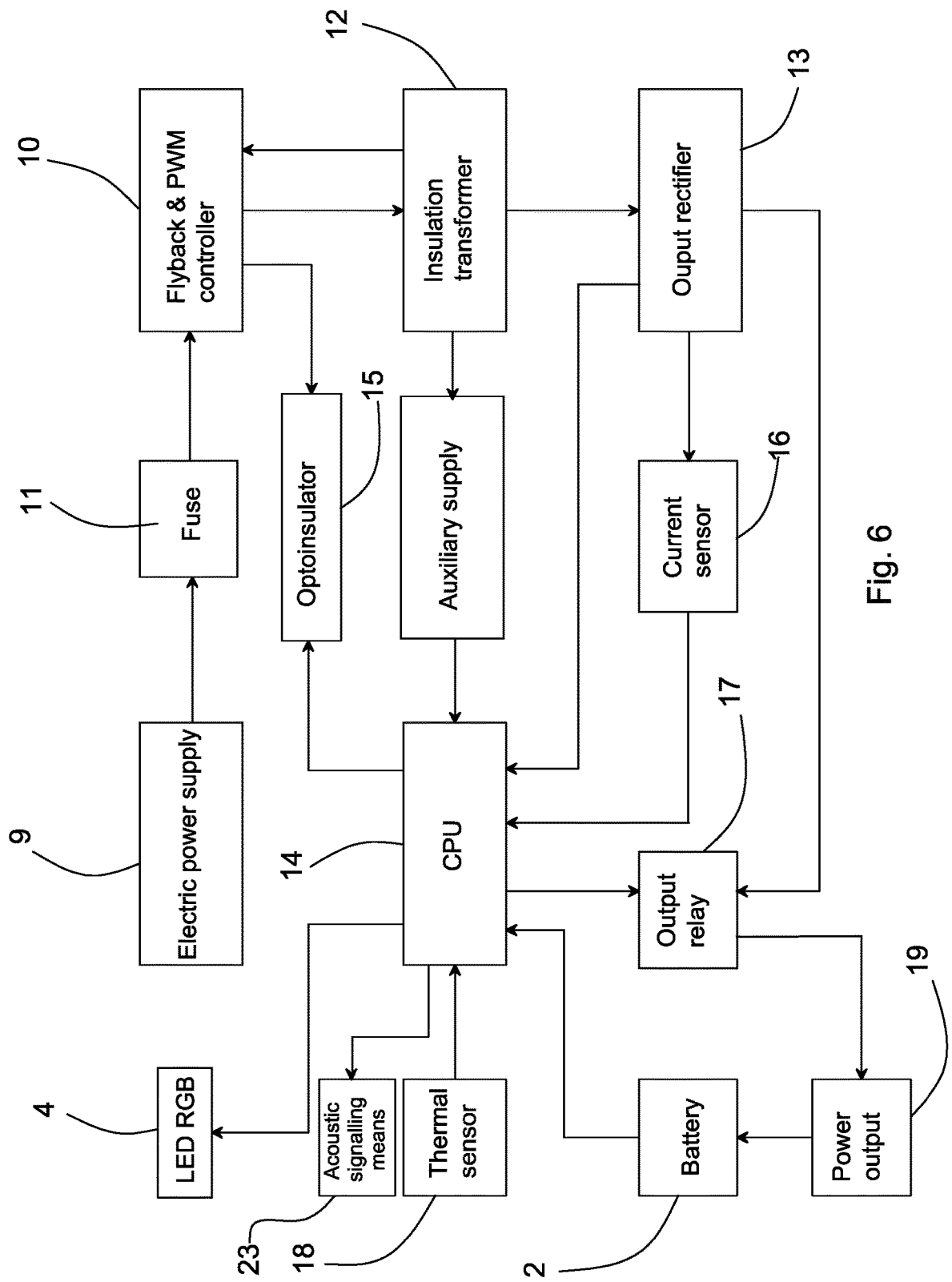
FIG. 6 is a block diagram of a version of the apparatus according to the invention.

In a lower face 5 of the body 1 an opening 6 is obtained through which it is possible to access a space 7 that is suitable for housing the power cord of the apparatus according to the invention (not shown) and the cables for connecting the apparatus, directly or indirectly, to a battery. The opening 6 has, in a central zone thereof, a narrowing 8, the dimensions of which are chosen in such a manner as to prevent the power cord and the connecting cables housed in the space 7 from exiting accidentally therefrom and so as not to hinder the extraction of the power cord and of the connecting cables from the space 7 when it is necessary to connect the apparatus to an electric power supply 9 (FIG. 5 and FIG. 6).

At least one notch 20 is made onto an edge 22 of the space 7, which notch 20 is provided at an open end thereof with a couple of elastic flaps 21. On the edge 22 two notches 20 are made, which are for example arranged opposite one another, but even three or more notches 20 can be made, which are spread along the edge 22. The notches 20 serve to fix the power cord and/or the connecting cables in order to cooperate with the narrowing 8 to prevent that said cables may exit from said space 7. The elastic flaps 21 serve to lock said cables after they have been inserted into the notches 20. Fixing said cables into the notches 20 also serve to prevent these cables from sliding below the edge 22 of the space 2, so as to destabilize the apparatus according to the invention when it rests with the edge 22 on a resting plane.

The apparatus according to the invention comprises a control device 10, by means of which the voltage and current are adjusted with which the battery 2 is supplied during the charging or charge maintenance procedure.

The control device 10 is connected to the electric power supply 9 via a safety fuse 11.

The control device 10 is driven by a processor 14 and supplies a power output 19 of the apparatus according to the invention, via an insulation transformer 12 and a rectifier 13. The power output 19 is intended to be connected, directly or indirectly, to a battery 2 to supply the battery 2 during the charging or charge maintenance procedure.

The processor 14 is supplied by the insulation transformer 12 and is connected to the control device 10 by an optoinsulator 15 that serves to protect the processor 14 from possible overvoltage coming from the electric power supply 9 through the control device 10.

The processor 14 is further connected, directly or indirectly, to a battery 2, so as to be able to read the voltage of the battery 2 during the charging or charge maintenance procedure.

The apparatus according to the invention is further provided with a current sensor 16, which is operationally connected to the processor 14 and to the rectifier 13, of a thermal sensor 18 which is operationally connected to the processor 14 and with a relay 17 interposed between the rectifier 13 and the power output of the apparatus. The current sensor detects the value of the charging current sent to the battery 2 and communicates it to the processor 14. The thermal sensor is used to detect any overheating of the apparatus and to notify such overheating to the processor 14. Lastly, the relay 17 is used to interrupt or enable the supply of current to the battery 2.

Besides the RGB LED 4, the processor 14 is also operationally connected to an acoustic signalling device 23 intended for emitting an acoustic signal for signalling abnormal conditions of the apparatus according to the invention or the battery 2.

The procedure of charging a battery 2 with the apparatus according to the invention comprises the following steps:

a preliminary step of checking the battery 2 connected to the apparatus according to the invention, to check if it is a type of battery 2 that is suitable for being charged by the apparatus according to the invention and the battery 2 is not damaged. After connecting the apparatus according to the invention to an electrical supply grid, the processor 14 checks that the apparatus is working. If the check is positive, the processor 14 commands the LED 4 so that it emits a flashing red light, which indicates to the user that the apparatus is ready to be used. If the check is negative, for example if the safety fuse 11 is broken, the processor 14 controls the LED 4 so that it emits a luminous alarm signal, for example a fixed red light, and activates the acoustic signalling device 23 that emits an acoustic alarm signal, which indicates to the user, together with the luminous alarm signal, that the apparatus is not useable. The use of an acoustic alarm signal combined with a luminous alarm signal has the advantage to ensure that the user is warned of a malfunction of the apparatus according to the invention, or, as detailed below, of the battery 2, even if the luminous signalling device, for any reasons, is inactive or is not visible or is hardly visible.

The type of battery 2 connected to the apparatus according to the invention is checked by measuring the voltage to the terminals, to check if it is compatible with the voltage of the type of battery 2 for which the apparatus according to the invention is intended, for example, in the case of lead-acid batteries, a voltage to the terminals that is not greater than about 14.5 V. Further, if the voltage measured at the terminals of the battery 2 is less than about 8.5 V, it is considered that the battery 2 is irremediably damaged. In both cases, i.e. voltage to the terminals above 14.5 V, or lower than 8.5 V, the processor 14 does not start up the charging procedure and the aforementioned luminous alarm signal and acoustic alarm signal are activated that warn the user that the user cannot proceed to charge the battery 2 because the battery 2 is not of a type that is suitable for being charged with the apparatus according to the invention, or is damaged.

A first, so-called "soft start" step, in which the apparatus according to the invention emits square wave-shaped current pulses, with intensity of about 2 A, i.e. below the normal maximum charging current of the battery 2, which, for example in the case of lead-acid batteries, is about 3.6 A. The duration of the current pulses is not predetermined but depends on the status of the battery 2. In fact, the descent front of the current pulses is less steep the greater the battery 2 charge is. When the value of the current absorbed by the battery 2 falls below about 100 mA a new current pulse is generated. Thus also the frequency of the pulses depends on the charge status of the battery 2, decreasing as the battery 2 charge increases.

This first "soft start" step lasts about 30 minutes, at the end of which, if the battery has not reached a voltage at the terminals of about 10.5 V, the processor 14 interrupts the charging procedure, deeming the battery to be damaged and activates the aforementioned alarm signals.

This first step is used to place the battery 2 in the optimum condition for charging and eliminating possible sulphation of the battery 2, breaking possible lead sulphate crystals that have been formed over time on the terminals of the single cells of the battery and that hinder battery recharging, preventing over time the complete recharging thereof.

A second step, which starts at the end of the first "soft start" step, i.e. after 30 minutes from the start of the charging procedure, in which the apparatus according to the invention supplies the battery 2 with a constant intensity current that, in the case of lead-acid batteries, is about 3.6 A. During this step the voltage at the terminals of the battery increases progressively until it reaches a maximum voltage value at which the constant current charging step stops. For lead-acid batteries, taking into account the fact that the maximum voltage at the ends of each cell can vary between approximately 2.37 V and 2.4 V, the maximum voltage reached at which constant current charging step stops can be set at about 14.2 V, for batteries with six elements.

A third step, the start of which is controlled by the processor 14 when the voltage at the terminals of the battery 2 has reached the aforesaid preset maximum value.

In this third step, the apparatus according to the invention supplies the battery 2 with constant voltage equal to the aforesaid preset maximum value. During this step, the charging current of the battery decreases progressively until a preset minimum value is reached, at which the processor 14 ends charging of the battery. This preset minimum value depends on the capacity of the battery. For example, in the event of a battery with a capacity of 20 Ah, the aforesaid minimum value can be fixed at approximately 200 mA.

When the three aforesaid steps of charging the battery 2 are being run, the LED 4 emits a fixed yellow light that shows the user that the apparatus according to the invention is running the charging procedure of the battery.

At the end of the charging procedure, the apparatus according to the invention can be left connected to the battery 2 to run a charge maintenance procedure, the object of which is to maintain the battery 2 charged at an optimum level over time, either when the battery 2 is in use and when the battery 2 is not in use, i.e. during periods of inactivity of the battery 2. Maintaining an optimum charging level of the battery 2 enables the performance of the battery 2 to be optimised and the lifespan of the battery 2 to be maximised.

The charge maintenance procedure comprises continuous monitoring of the voltage at the terminals of the battery 2 by means of the processor 14. When the processor 14 detects that the voltage at the terminals has reached a preset minimum value, the start of a short constant voltage charging cycle is commanded that ends when the voltage at the terminals reaches a preset maximum value.

Said maximum and minimum values can be calculated with reference to an average maintenance voltage value that, in the case of lead-acid batteries, can be fixed, for example, at a value of 13.6 V. Said maximum and minimum values can, for example, correspond to a deviation of ±0.5 V from said average value, i.e. respectively to 14.1 V and 13.1 V.

Running of the maintenance step is indicated by the LED 4 by the emission of a fixed green light.

Figure 3:
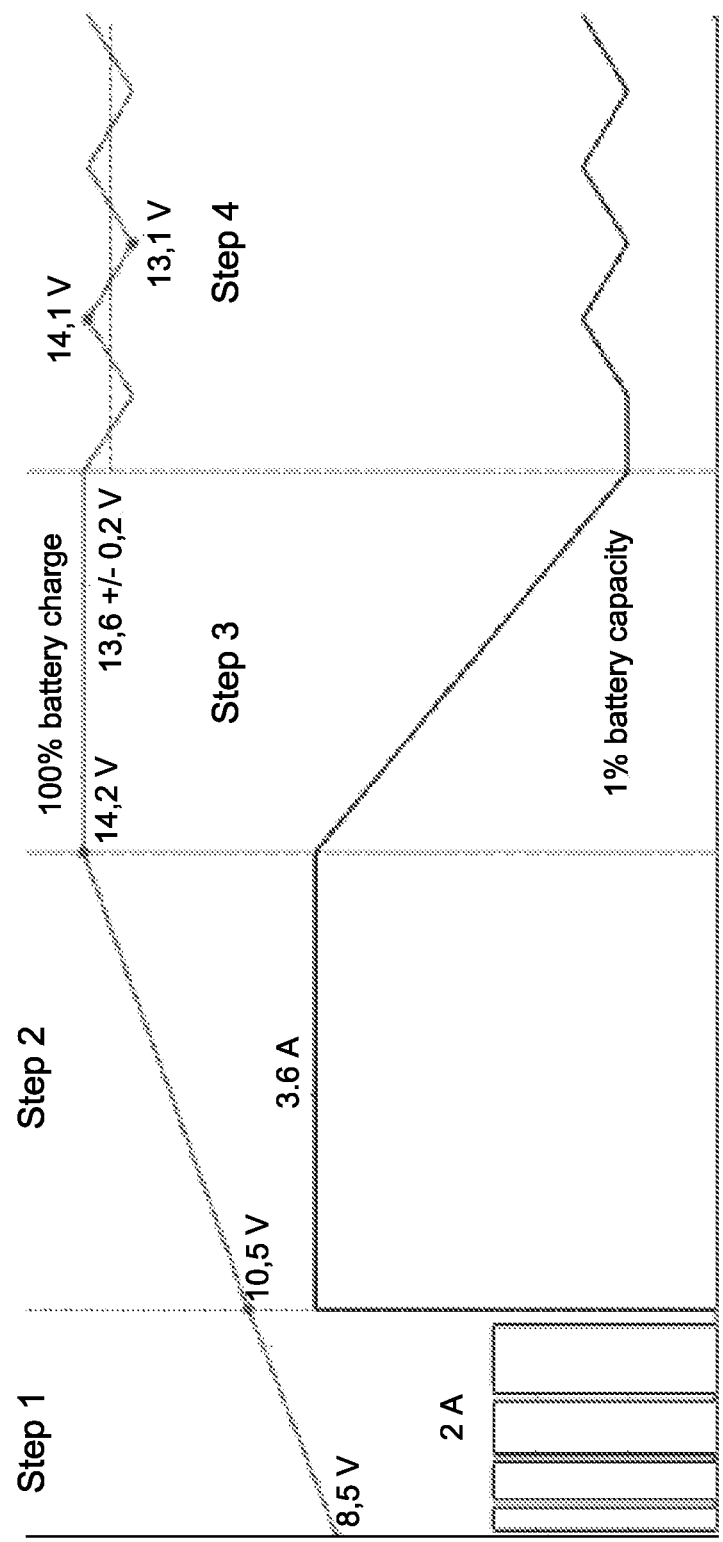
FIG. 3 is a diagram that illustrates a charging and charge maintenance cycle of a battery that is achievable with the apparatus according to the invention.
Figure 4:
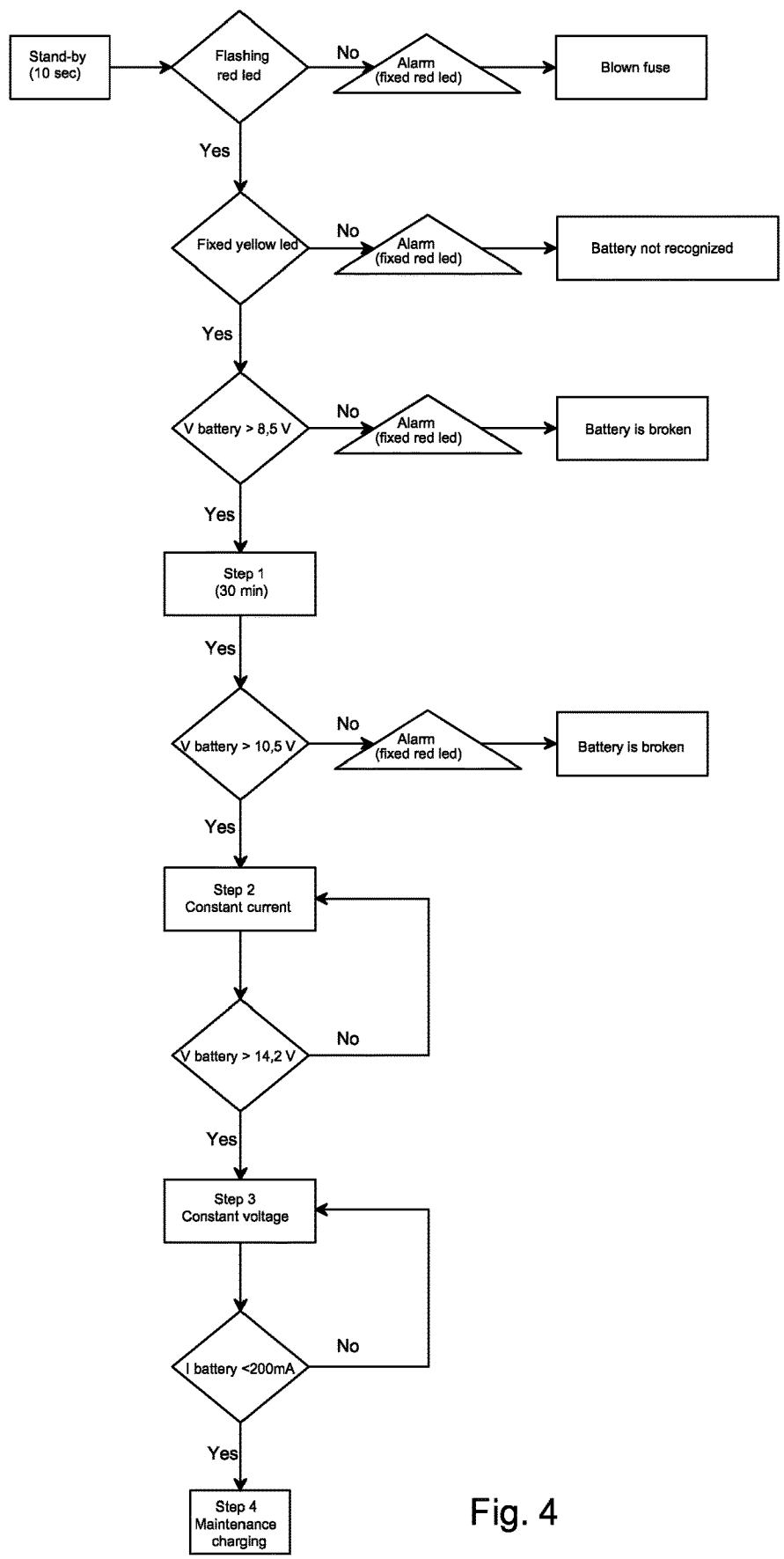
FIG. 4 is a flow chart that illustrates the operation of the apparatus according to the invention.
Figure 7:
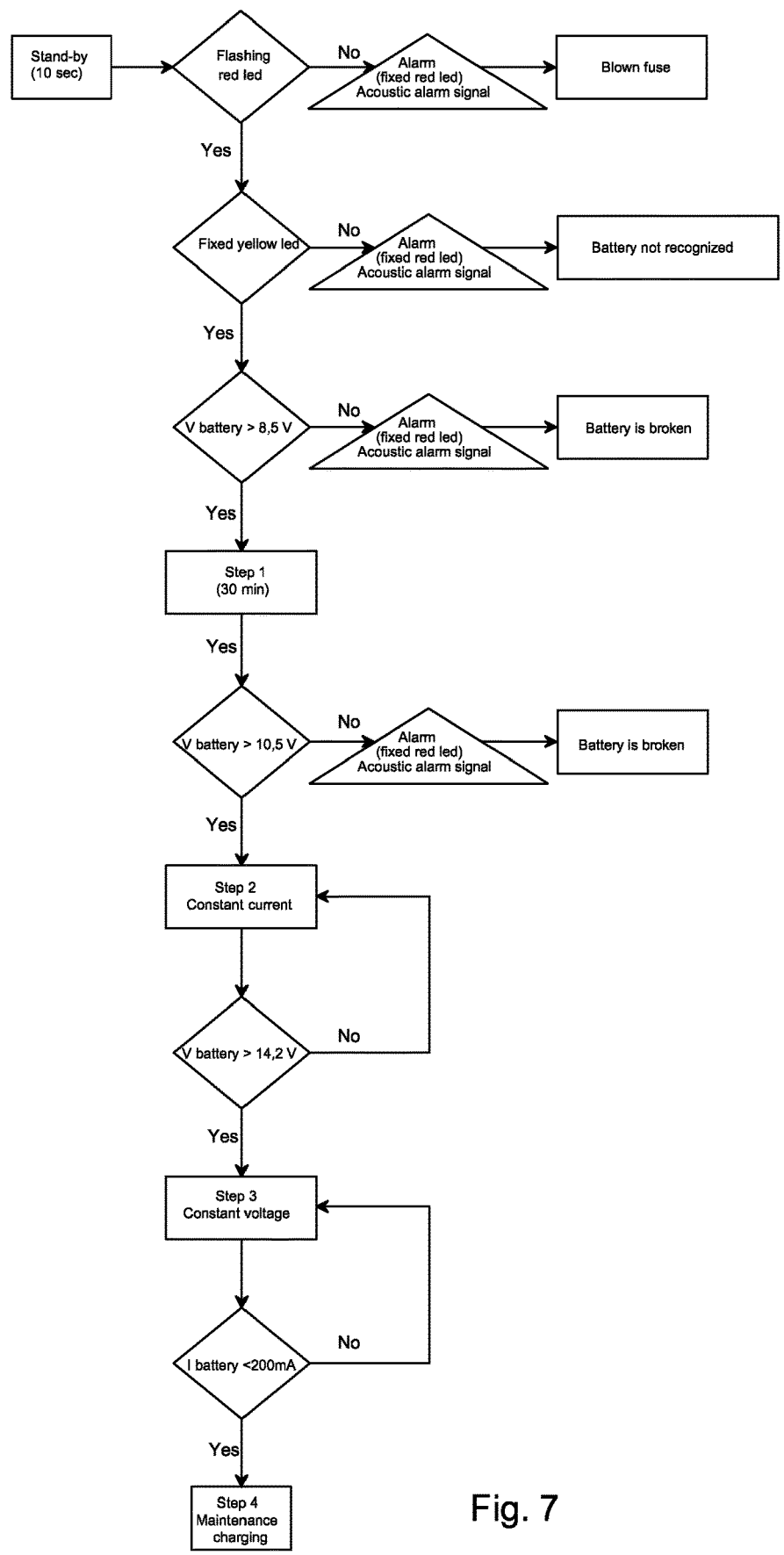
FIG. 7 is a flow chart that illustrates the operation of the version of the apparatus according to the invention shown in FIG. 6.

The various operating steps of the apparatus according to the invention are illustrated in the diagram of FIG. 3 showing the trend of the current supplied by the apparatus in the different steps and in the flow charts of FIGS. 4 and 7 that illustrate the operating logic of the apparatus according to the invention.

The apparatus according to the invention is provided with a protection system against possible overtemperature that could damage the components of the apparatus, reducing the efficiency of the components or damaging the components irreparably.

The protection system is managed by the processor 14 via the thermal sensor 18, which measures the temperature inside the apparatus according to the invention.

If the processor 14 detects that the temperature measured by the thermal sensor 18 exceeds a first preset threshold value, for example 60° C., a reduction is commanded of the maximum value of the current supplied by the apparatus according to the invention. This reduction can be, for example, equal to 25% of said maximum value. The object of this reduction is to enable the temperature of the apparatus to be decreased.

If, despite the decrease of the maximum supplied current the temperature continues to increase, reaching a second preset threshold value, for example 70° C., the processor 14 commands a further decrease of maximum value of the current supplied, for example equal to 50%, to avoid a further temperature increase.

If the temperature of the apparatus according to the invention continues to increase, the processor 14 switches off the apparatus and activate the alarm signals.

If, on the other hand, the temperature decreases, the processor 14 returns the value of the supplied current to 75% of the maximum value when the temperature falls below the second threshold value and to 100% of maximum value when the temperature falls below the first threshold value.

The threshold values are chosen according to the features of the components of the apparatus, i.e. on the basis of the maximum operating temperature that they can bear without being damaged or diminishing performance thereof.

The aforesaid protection system enables the apparatus according to the invention to be run always in the best conditions, regardless of the environmental conditions in which the apparatus is arranged to operate and the apparatus to be protected from possible damage caused by overheating.

In the present description, reference has been made to charging a lead-acid battery; nevertheless, it is clear that the apparatus and method disclosed are applicable also to charging other types of batteries.

In the practical embodiment, the materials, dimensions and constructional details may be different from those indicated but be technically equivalent thereto without thereby falling outside the scope of the present invention.

What is claimed is:

1. A method for charging a battery by means of an apparatus for charging batteries comprising:
   a first battery heating and desulphation step, a second constant current charging step and a third constant voltage charging step,
   wherein in said first step the battery is supplied with current pulses having a maximum value that is lower than the maximum value of the charging current in said second constant current charging step, each current pulse being generated when the current absorbed by the battery after the delivery of a previous current pulse falls below a minimum preset value, and
   wherein the method further comprises monitoring the operating temperature of said apparatus and varying the maximum value of the current dispensed by the apparatus, said varying comprising reducing to a first preset value the maximum value of the current dispensed by the apparatus when the operating temperature thereof reaches a first threshold value, further reducing to a second preset value the maximum value of the current dispensed by the apparatus when the operating temperature thereof reaches a second threshold value and switching off the apparatus if the operating temperature thereof exceeds said second threshold value.

2. The method according to claim 1, wherein said current pulses are pulses having a square wave shape.

3. The method according to claim 1, further comprising a fourth step of maintaining a charge of the battery, said fourth step comprising starting a constant voltage charging step if a voltage at the terminals of the battery reaches a preset minimum value and interrupting said constant voltage charging step when the voltage at the terminals of the battery reaches a preset maximum value.

4. The method according to claim 1, comprising returning the value of the dispensed current to said first preset value if the temperature of the apparatus falls below said second threshold value and returning the value of the dispensed current to said maximum value if the temperature of the apparatus falls below said first threshold temperature.

* * * * *